3,441,108
DEVICES FOR SIMULTANEOUSLY APPLYING
THE BRAKES OF A TRACTOR AND OF ITS
TRAILER
Raymond Boueil and Gerard Gardeux, Billancourt,
France, assignors to Regie Nationale des Usines
Renault, Billancourt, France
Filed Feb. 12, 1968, Ser. No. 704,841
Claims priority, application France, Mar. 23, 1967,
100,019
Int. Cl. B60t 7/20; G05g 9/00, 13/00
U.S. Cl. 188—3                            3 Claims

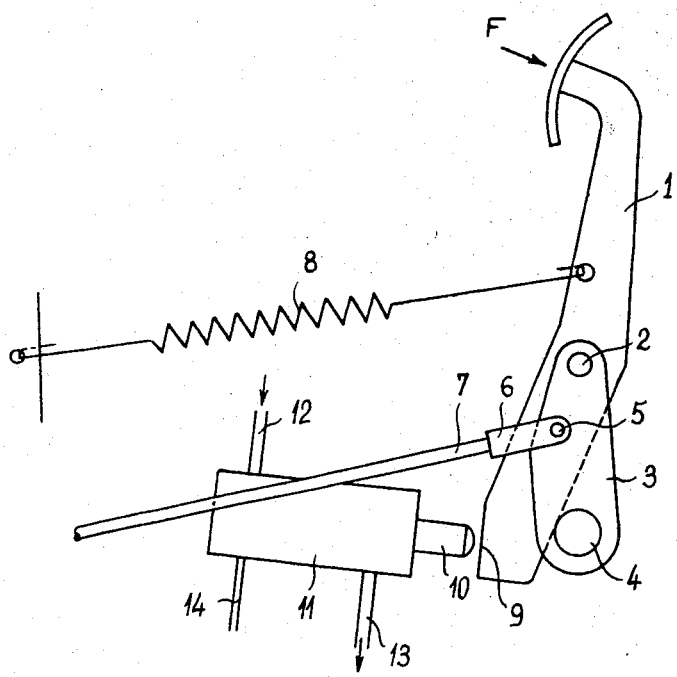

ABSTRACT OF THE DISCLOSURE

The pull rod controlling the tractor brakes and the brake pedal are fulcrumed on pivot pins carried by a common movable lever fulcrumed in turn about a fixed pivot pin, the brake pedal having beyond its fulcrum a heel-shaped lower extension for actuating the trailer brake control valve before said common lever pulls said rod for actuating the tractor brakes when the brake pedal is depressed against the resistance of a return spring.

---

The present invention relates to a device for simultaneously applying the brakes of a farming tractor and of its trailer.

It is known that modern trailers are equipped as a rule with brakes adapted to be remote-controlled by means of a valve inserted in the hydraulic circuit, and the tractors to which these trailers are coupled are frequently equipped with mechanically controlled brakes actuated for example by means of a pull-rod connected to the brake pedal.

It is the essential object of this invention to provide a very simple braking device whereby a single operation permits of actuating simultaneously the hydraulic means controlling the trailer brakes and the mechanical means controlling the tractor brakes while causing initially the trailer brakes to be applied before the tractor brakes.

This device is characterised in that the tractor brake control rod and the brake pedal are fulcrumed on pivot pins carried by a common movable lever fulcrumed in turn on a fixed pivot pin, the pedal having a lower extension beyind its fulcrum, in the form of a heel portion adapted to actuate the trailer brake control valve before said common lever pulls the tractor brake control rod when the brake pedal is depressed against the resistance of a return spring.

In order to afford a clearer understanding of this invention, a typical form of embodiment thereof will now be described by way of example with reference to the single figure of the attached drawing illustrating diagrammatically by way of example the brake control device forming the subject-matter of the invention.

In the drawing, a brake pedal 1 of a farming tractor is fulcrumed on a pivot pin 2 secured to a movable lever 3 pivotally mounted on a fixed pin 4. Attached to this lever 3, by means of a pin 5 and a strap 6, intermediate the pivot pins 2 and 4, is a pull rod 7 controlling the tractor brakes. A return spring 8 constantly urges the brake pedal 1 and therefore the rod 7 to the inoperative position shown in the figure.

The brake pedal 1 has an extension beyond its pivot pin 2 in the form of a heel 9 registering with the push member 10 of a hydraulic valve 11 controlling the trailer brakes. This valve 11 receives via a pipe line 12 the oil from the hydraulic distributor of the tractor, this oil returning to the reservoir via a pipe line 13 when the valve is inoperative. The third line 14 connects the hydraulic valve 11 to the trailer brakes.

This device operates as follows:

When the brake pedal 1 is depressed with a force F the heel 9 thereof engages the push member 10 of valve 11 and begins to depress same, whereby the pipe line 13 connecting the valve to the reservoir is gradually closed. Thus, the oil pressure rises in the valve and is transmitted through the control line 14 to the trailer, and thus the trailer brakes begin to be applied.

At the same time, as the driver's effort F is continued the pedal 1 bears against the depressed push member 10 and moves the pivot pin 2 to the right, thus causing the lever 3 to rotate about the fixed pin 4 and therefore to exert a tractive effort on the rod 7 controlling the tractor brakes.

When the brake pedal is released, the latter resumes its inoperative position due to the traction exerted by the return spring 8. Thus, the heel portion 9 of the brake pedal releases in turn the push member 10 of valve 11 which, as it resumes its inoperative position, opens the exhaust line 13 to reduce the fluid pressure in the valve and release the trailer brakes. At the same time the rod 7 resumes its inoperative position and releases the tractor brakes.

From the foregoing it is clear that the trailer brakes are applied before the tractor brakes, as required. Immediately after the trailer brake application begins, the force with which the tractor brakes are applied will become proportional to that exerted on the trailer brakes, with a ratio governed by the value of the oil pressure obtaining in valve 11 for a given effort exerted on the push member 10 thereof.

The two braking forces (i.e., those exerted respectively on the trailer brakes and on the tractor brakes) are adjustable in relation to each other, but in all cases they remain both constantly proportional to the effort F exerted on the brake pedal.

We claim:
1. Device for simultaneously applying the brakes of a farming tractor and of its trailer, the former having a mechanical brake control system actuated by a pedal and the latter a hydraulic brake control system responsive to a hydraulic valve, characterised in that the tractor brake control rod and the brake pedal are fulcrumed respectively on pivot pins secured to a common movable lever fulcrumed in turn on a fixed pivot pin, said pedal having beyond its fulcrum a lower, heel-forming extension adapted to actuate the trailer brake control valve before said common lever pulls the tractor brake control rod when the brake pedal is depressed against the resistance of a return spring.

2. Brake control device according to claim 1, characterised in that the pivot pin of said tractor brake control rod is positioned on said common lever intermediate the pedal pivot pin and the fixed pivot pin on which said lever is mounted.

3. Brake control device according to claim 1, characterised in that the heel portion of said brake pedal engages the push member of said hydraulic valve controlling the trailer brakes so as to close the port permitting the exhaust of oil to the reservoir when the brake pedal is depressed.

References Cited

UNITED STATES PATENTS

| | | | |
|---|---|---|---|
| 2,169,668 | 8/1939 | Thomas | 188—3 |
| 2,349,167 | 5/1944 | Gunderson | 188—3 |
| 3,135,358 | 6/1964 | Greentree | 188—3 |

FERGUS S. MIDDLETON, *Primary Examiner.*

T. W. BUCKMAN, *Assistant Examiner.*

U.S. Cl. X.R.

74—471